United States Patent
Le et al.

(10) Patent No.: US 7,686,529 B1
(45) Date of Patent: Mar. 30, 2010

(54) TWO-AXIS JOINT ASSEMBLY AND METHOD

(75) Inventors: Thang D. Le, Friendswood, TX (US); James L. Lewis, Houston, TX (US); Monty B. Carroll, League City, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 11/958,908

(22) Filed: Dec. 18, 2007

(51) Int. Cl.
*F16D 3/00* (2006.01)

(52) U.S. Cl. .......................... 403/78; 403/79

(58) Field of Classification Search ... 244/172.4–172.5; 74/490.01–490.06; 403/78–79
See application file for complete search history.

(56) References Cited

U.S. PATENT DOCUMENTS

| | | | |
|---|---|---|---|
| 4,173,324 A | 11/1979 | Rudmann | |
| 4,391,423 A | 7/1983 | Prutt et al. | |
| 4,431,333 A | 2/1984 | Chandler | |
| 4,903,919 A | 2/1990 | Johnson et al. | |
| 4,905,938 A | 3/1990 | Braccio et al. | |
| 5,005,786 A | 4/1991 | Okamoto et al. | |
| 5,094,410 A | 3/1992 | Johnson | |
| 5,364,046 A | 11/1994 | Dobbs et al. | |
| 6,125,618 A | 10/2000 | Dillon | |
| 6,129,478 A | 10/2000 | Hubert | |
| 6,196,502 B1 | 3/2001 | Eyerly | |
| 6,203,237 B1 | 3/2001 | Swift et al. | |
| 6,290,182 B1 | 9/2001 | Grunditz | |
| 6,418,811 B1 * | 7/2002 | Rosheim | 74/490.06 |
| 6,425,177 B1 | 7/2002 | Akeel | |
| 6,454,214 B1 | 9/2002 | Smith | |
| 6,454,218 B1 | 9/2002 | Jacobson | |
| 6,494,407 B2 | 12/2002 | Arulf | |
| 6,612,101 B2 | 9/2003 | Dillon | |
| 6,658,962 B1 | 12/2003 | Rosheim | |
| 2004/0018042 A1 * | 1/2004 | Smith | 403/78 |

* cited by examiner

*Primary Examiner*—Victor MacArthur
(74) *Attorney, Agent, or Firm*—Theodore U. Ro

(57) ABSTRACT

In an embodiment, a two-axis joint that utilizes planar reactions to handle moments applied to the side of the joint thereby allowing the device to remain low profile and compact with minimal intrusion to the mounting surface of the two-axis joint. To handle larger moments, the diameter of the planar member can be increased without increasing the overall height of the joint assembly thereby retaining the low profile thereof. Upper and lower antifriction bearings may be positioned within a housing engage the planar member to reduce rotational friction. The upper and lower bearings and a hub which supports the planar member transfer forces produced by moments applied to the side of the joint so as to spread the forces over the area of the housing.

5 Claims, 3 Drawing Sheets

TWO-AXIS JOINT ASSEMBLY AND METHOD

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention relates generally to a two-axis joint assembly and, in one more particular embodiment, provides a low profile, compact, surface-mountable assembly which supports high side loads with low friction operation.

2. Description of Related Art

A two-axis joint is a mechanical device which provides two degrees of freedom of motion between connected components, e.g., a joint between a base and a rod such that the rod is constrained to move only within a first axis of rotation and/or a second axis of rotation.

A simple example of a commonly used two-axis joint is a two-axis connection for oars in a row boat. A yoke or shackle or clevis provides the receptacles or base into which the oars are placed. The oars fit into the U-shaped yokes and, in this example, may also be pinned in position or least prevented by friction from sliding whereby the oars can swing up and down to provide the first axis of rotation for rotational movement of the oars. The U-shaped clevis or yoke has a shaft at the end of the U-shaped clevis or yoke which extends through a socket or perhaps through aligned holes in several flanges. The shaft is rotatable in the socket or holes through which it extends to provide the second axis rotation such that the oars rotate around the shaft and clevis to swing back and forth. Accordingly, once the oars are positioned in the yoke or clevis, the oars may be pivoted upwardly and downwardly and also rotate around the joint. The clevis is secured in position by the shaft to thereby act as a fulcrum so that side loads applied thereto are transferred to the water so as to propel the boat. The length and diameter of the shaft and construction of the socket is designed to be sufficiently long and mechanically strong to absorb the side loads applied during rowing.

Conventional high moment two-axis joints require increased depth of engagement between the rotating shaft and a housing to which the shaft is secured to react to an increase in applied moments. This type of configuration requires the depth of engagement to act as a reacting or bearing surface below the joint to react to the applied moments. In other words, a long shaft has to be inserted into a deep hole to react to the moments created by side loads applied at one end of the shaft. The deeper the hole is, the more space required for mounting the device. However, in some applications where a two-axis joint would be highly desirable, a mounting structure which provides a deep hole or support therefore may be unavailable or undesirable.

It will be understood that the example of the two axis connection for oars in a row boat is illustrative of a relatively low-load application which may not utilize bearings. To support very high moments acting thereon, conventional two-axis joints may utilize bearings axially spaced relatively far apart along the shaft to meet the high moment requirements. Because of the shaft length, these conventional two-axis joints assemblies are not suitable for applications where only minimal intrusion is allowed onto the support platform. The shaft-in-hole approach requires that space below the joint be available to react the moments. This space is not available for applications requiring a surface mounted only apparatus.

U.S. Pat. No. 6,290,182, issued Sep. 18, 2001, to Grunditz, discloses a joint in a space vehicle to hold together a first part of the vehicle and a second part of the vehicle that can be separated from the first part, in which the joint includes a first flange member attached to the first part of the vehicle and a second flange member attached to the second part of the vehicle. A number of clamps equipped with two clamping lips are distributed around the perimeter of the flange members that transfer radial force from a tensioning means, arranged around the clamps, to both of the flange members in order to press these together, whereby rolling members are arranged between at least one of the clamping lips of the respective clamps and the adjacent first or second flange member.

U.S. Pat. No. 6,418,811, issued Jul. 16, 2002, to Rosheim, discloses a controlled relative motion system comprising a base support, a manipulable support, a group of link end constrainers each having a first portion movably connected to a second portion thereof so that ends of the first and second portions can be selectively separated from one another in a selected direction so as to have a selected distance therebetween, and two groups of pivoting links. With at least four link end constrainers in the group thereof, the first group of pivoting links has corresponding links each rotatably coupled to force imparting means or to the base support so as to be rotatable about a corresponding base link axis where each of said base link axes extend into regions between adjacent ones of said first group of pivoting links into which regions said base link axes of said adjacent ones also extend, and each coupled to a first portion end of a corresponding one of the group of link end constrainers. The second group of pivoting links each rotatably coupled to the manipulable support and a corresponding one of the group of link end constrainers second end. Four or more or less numbers of link end con strainers in the group thereof are useable in the form of straps or interconnected "eye" bolts with corresponding number of pivoting links in the two groups.

U.S. Pat. No. 6,494,407, issued Dec. 17, 2002, to Arulf, discloses a joint on a spacecraft for holding together a first craft part and a second craft part, detachable from the first craft part. The joint comprises a first flange fixed on the first craft part, and a second flange fixed on the second craft part, and a number of clamps having a first and a second clamp lip, the said clamps being distributed about the periphery of the flanges. The clamps transfer radial forces from a tightening device, fitted to the clamps, so as to fasten the two flanges together. The first flange is clamped between a first clamp surface on the first clamp lip, and a separation surface on the second flange. These surfaces form an acute angle the apex of which is directed in towards the spacecraft.

U.S. Pat. No. 6,612,101, issued Sep. 2, 2003, to Dillon, discloses a method for articulating an articulated vehicle from a rest position, the vehicle being composed of a forward unit and a tracked rearward unit having a pair of powered tracks. The forward and rearward units are connected by a joint and an articulation cylinder. The method powers up only one track, while simultaneously actuating the articulation cylinder.

U.S. Pat. No. 6,658,962, issued Dec. 9, 2003, to Rosheim, discloses a controlled relative motion system having first and second support structures with a controlled output position joint connecting them, and with similar joints on these support structures. One joint is coupled to another controlled relative motion system having an output carrier rotatable in two perpendicular directions through the use of gears therein. This output carrier supports two articulated manipulating systems of which one has a single axis rotatable subbase supporting a rotatable gripping extension, and the other has a shackle connected to a base effector which shackle is supported on a fixed pedestal and another shackle connected to a base effector which shackle is supported on a moveable pedestal.

The above cited references do not disclose a low-profile surface mountable two-axis joint capable of supporting high side loads and operating with little friction. In related art, a two-axis joint generally consists of two pairs of ball bearings in an orthogonal configuration. Each pair of bearings require a spatial separation distance to provide moment reaction capability. However, two orthogonal ball-bearing sets require significant volume. When reduction of bending moment due to external loads is desired, the joint generally needs to penetrate the mounting surface of the applicable structure or platform to lower the point of application of applied forces. The problem is that, as a result of previous statement, the joint is partially embedded in the applicable structure or platform. Those skilled in the art have long sought and will appreciate the present invention that addresses these and other problems.

SUMMARY OF THE INVENTION

An object of the present invention is to provide an improved two-axis joint.

Yet another objective of the present invention is to provide a two-axis joint which has a low profile and/or which may be surface mounted onto a desired platform.

An advantage of the present invention is that the two-axis joint can be designed to handle greater moments applied to the side of the joint without increasing the height of the already low profile of the apparatus.

Any listed objects, features, and advantages are not intended to limit the invention or claims in any conceivable manner but are intended merely to be informative of some of the objects, features, and advantages of the present invention. In fact, these and yet other objects, features, and advantages of the present invention will become apparent from the drawings, the descriptions given herein, and the appended claims.

Accordingly, the present invention provides a two-axis connection assembly for interconnecting with one or more moveable members so as to constrain movement of a respective one of the one or more moveable members within a first axis of rotational movement and a second axis of rotational movement. The connection assembly may comprise one or more elements such as, for instance, a housing defining an opening therein. In this example, a disk such as a planar member positioned within the housing, and a receptacle affixed to the planar member. The receptacle may be positioned adjacent to or within the opening in the housing such that the receptacle is accessible from outside the housing for the interconnection with one of the moveable members. The receptacle defines the first axis of rotational movement for one of the moveable members. The two-axis connection assembly may further comprise a shaft in proximate spatial relationship with the receptacle wherein the first axis of rotational movement projects through the shaft.

Other elements may comprise a rotational mounting for the planar member and the receptacle such that the planar member and the receptacle are rotatable with respect to the housing. This provides the second axis of rotational movement for the moveable members. The first axis of rotation may be transverse, orthogonal, or at right angles with respect to the second axis of rotation. The rotational mounting may be secured with respect to the housing such that at least a portion of a force applied to a side of the receptacle is transmitted to the housing.

In one possible embodiment, the two-axis connection assembly may further comprise a plurality of planar members within the housing, and a plurality of receptacles carried by the plurality of planar members, and a plurality of rotational mountings to permit the plurality of planar members and the plurality of receptacles to rotate with respect to the housing. The plurality of receptacles is then connectable to a plurality of moveable members via a means for connection. Moreover, the housing may define a plurality of corresponding openings for the plurality of receptacles. Accordingly, it will be appreciated that the present invention may utilize multiple two-axis connections within a single housing, e.g., two, four, six, or any other number of two-axis connections as desired.

The two-axis connection assembly may further comprise a rotational mounting which may comprise a hub for rotatably supporting the receptacle and the planar member for rotation around the hub. The second axis of rotational movement may project through the hub. The hub may be positioned in proximate spatial relationship with the base the receptacle, and planar member. In one embodiment, the hub is formed on an inner surface of the base.

In one possible embodiment, the rotational mounting may be further comprised of an upper bearing for supporting an upper surface of the planar member and a lower bearing for supporting a lower surface of the planar member. Additionally, the rotational mounting may further comprise one or more shims sized to adjust an amount of a preloaded force that is applied to the upper bearing and the lower bearing. The upper bearing may comprise an antifriction bearing and the lower bearing may also comprise an antifriction bearing.

The present invention also comprises a method for making a two-axis joint for interconnecting a platform with one or more moveable members so as to constrain movement of a respective one of the one or more moveable members within a first axis of rotational movement and a second axis of rotational movement. The method may comprise one or more steps such as such as, for example determining an anticipated moment to be applied to a receptacle wherein the hinge connector defines the first axis of rotational movement for the respective one of the one or more moveable members. The method may further comprise determining a size of a planar member necessary to support forces related to the moment when the receptacle is secured to the planar member. In one embodiment, the planar member is substantially parallel to the platform and is mounted so as to transfer the forces to the platform. Other steps may comprise rotationally mounting the planar member on bearings for transferring the force to the platform through the bearings while permitting rotation of the planar member and the receptacle. The rotational mounting may define the second axis of rotational movement for the respective one of the one or more moveable members. In one embodiment, the first axis of rotation may be transverse, at right angles, or orthogonal with respect to the second axis of rotation.

The method may further comprise providing a housing defining an opening therein so the receptacle is positioned adjacent to or within the opening in the housing such that the receptacle is accessible from outside the housing for the interconnection with a moveable member, e.g. a strut, rod, actuator, or the like. The method may further comprise rotatably mounting a plurality of planar members within the housing for carrying a plurality of receptacles and providing the housing with a plurality of corresponding openings for the plurality of receptacles. In this embodiment, multiple two-axis joints may be provided for connecting to multiple struts, rods, actuators, or the like.

In an embodiment a low profile is provided for the two-axis joint by providing that a height of the housing with respect to the platform is less than one-half of a width of the housing. In another preferred embodiment, a surface mount is provided for mounting the two-axis joint to a platform by providing that the two-axis joint is mounted to the platform without making a hole in the platform for receiving an element rotatable with rotation of the planar member.

Other steps may comprise providing a hub for rotatably supporting the receptacle and the planar member for rotation around the hub. The second axis of rotational movement for the respective one of the one or more members may project through the hub. The method may further comprise providing a base for the housing, and positioning the hub between the base and the receptacle and planar member. The method may further comprise forming the hub on an inner surface of the base.

In one embodiment, the method may comprise providing an upper bearing for supporting an upper surface of the planar member and providing a lower bearing for supporting a lower surface of the planar member and/or may comprise providing one or more shims sized to adjust an amount of a preloaded force that is applied to the upper bearing and the lower bearing.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

BRIEF DESCRIPTION OF PREFERRED EMBODIMENTS

Figure 1:
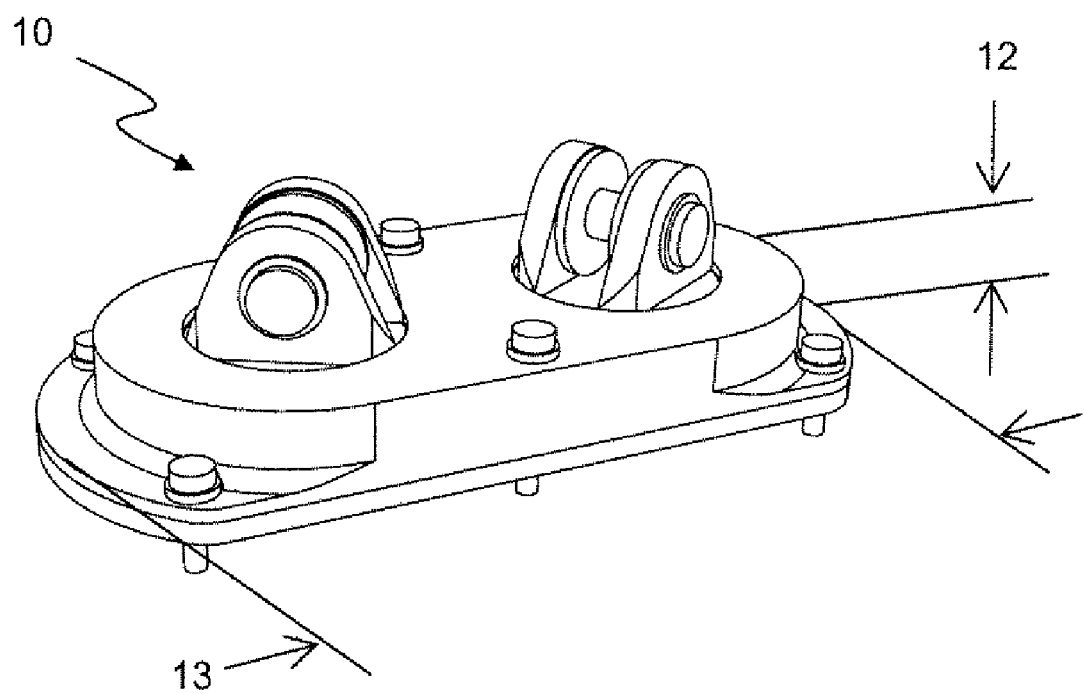
FIG. 1 is an is an isometric view of a fully assembled dual two-axis joint assembly in accord with one possible embodiment of the present invention.
Figure 2:
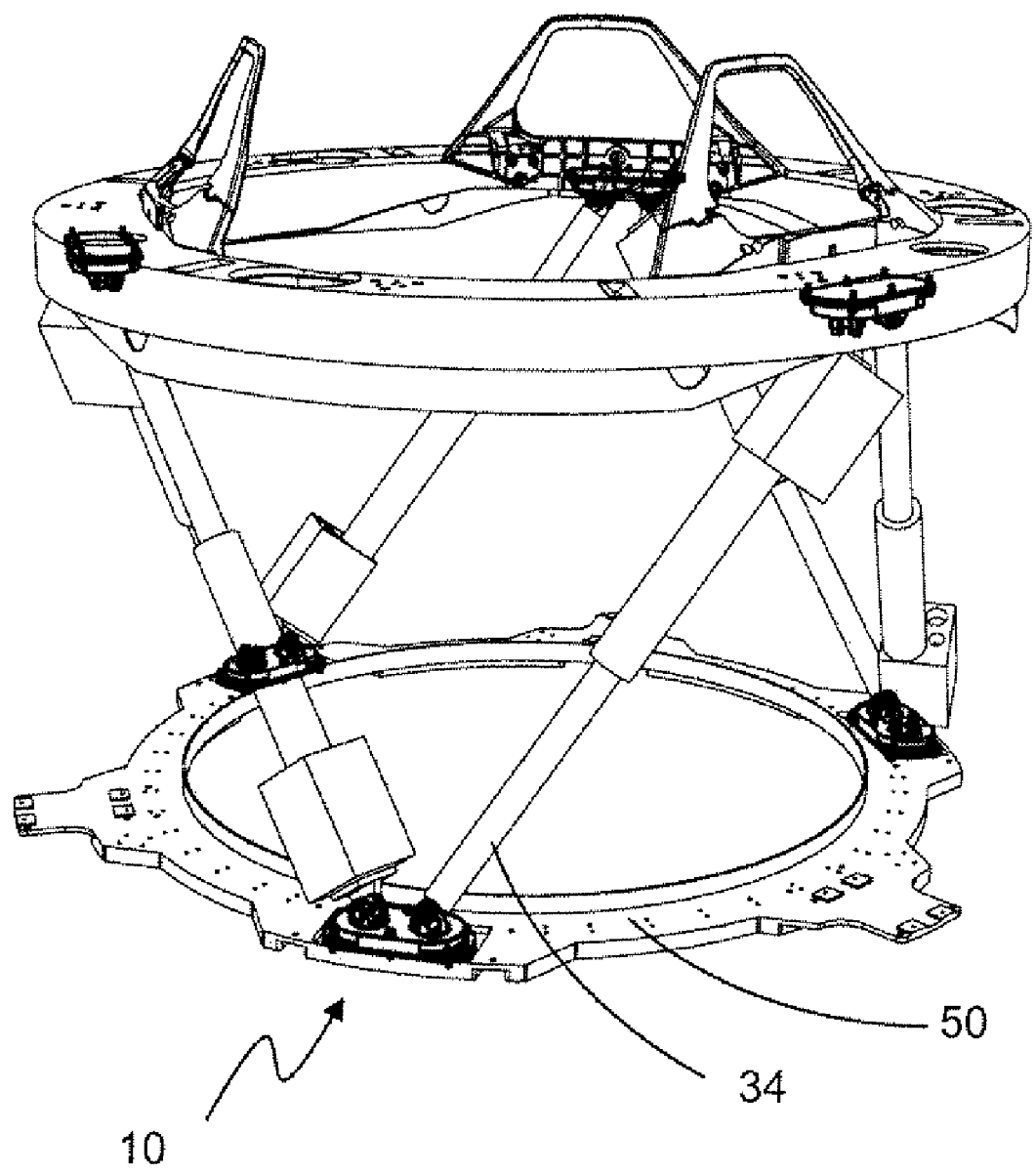
FIG. 2 is an isometric view of a plurality of two-axis joint assemblies in an application wherein each of the plurality of two-axis joint assemblies is connected to two actuators.
Figure 3:
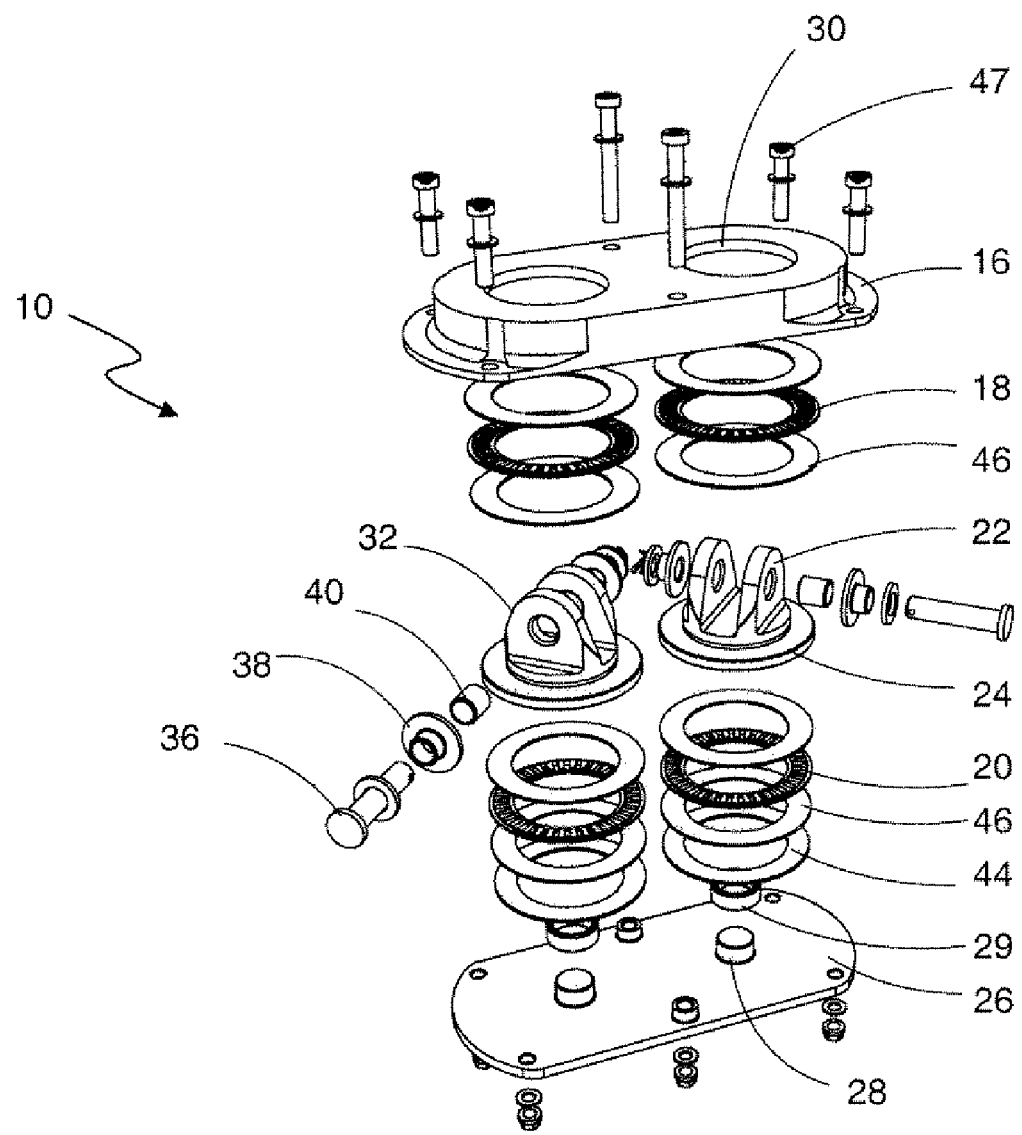
FIG. 3 is an exploded isometric view of the components of a dual two-axis joint assembly in accord with one possible embodiment of the present invention.

Referring now to the drawings and more particularly to FIGS. 1-3, there is shown an embodiment of a dual two-axis joint assembly 10 in accord with the present invention. The mechanical arrangement of dual two-axis joint assembly 10 provides a small, compact physical profile, e.g., height 12 which is the height of the entire joint is small as compared to the length and width 13 thereof. As used in herein, the words "length" and "width" are equivalent in meaning.

In the present example shown in FIGS. 1-3, housing height 12 is less than one-third of the housing width 13 or housing length but may be much smaller. Due to the presence of multiple two-axis joints 10 within housing 16 aligned along the length of the housing, as per the embodiment of FIGS. 1-3, height 12 is much less than the length 13 of housing 16. In an embodiment, the present invention permits for the low profile of housing 16 by eliminating the need for a long shaft to support side loads as in related art two-axis joint designs. Accordingly, two-axis joint assembly 10 may be used in tight spaces where a high-load capability is required. As well, two axis joint assembly 10 may be used in applications where penetrating the mounting surface is not an option such as in applications where surface-mounting is required. Two-axis joint assembly 10 can be used in a wide variety of mechanisms and mechanical systems. It is effective where precise, smooth, continuous motion is desired.

As one possible use, two-axis joint 10 or embodiments thereof in accord with the present invention may find use in a spacecraft docking system capture mechanism. For example, such a joint can be used at the end of a linear actuator that is required to extend and rotate simultaneously as described in U.S. Pat. No. 6,354,540 B1 which provides details of a spacecraft docking system. The spacecraft docking system uses linear actuators to provide motion between its driven component and its support base but is required to be significantly compact when fully retracted. To support the mechanical system's range of motion, two-axis joint 10 of the present invention pivots with minimal friction to maximize the responsiveness of the system. In some configurations, the mechanical system will be subjected to high applied loads that create high moments in the two-axis joints. In this embodiment, the first axis of rotation and the second axis of rotation are at least transverse or cross-wise with respect to each other but may typically be orthogonal with respect to each other.

A non-limiting list of other possible applications may include industrial robotic or assembly line apparatuses, positioning systems, complex multi-axis manipulators for various motion purposes for motion based simulators, automobile steering, transmission systems, aircraft control surface linkages, and the like.

Housing base 26 may be welded, bolted, or otherwise mounted onto the desired platform, such as platform 50 shown in FIG. 2. In an embodiment, the platform 50 is comprised of a lower ring of a spacecraft docking assembly. Alternatively, the desired platform may itself define a suitable housing base 26 so that housing base 26 is not necessarily utilized. When utilized, housing base 26 supports high moments by distributing the forces over the extent of the area of housing base 26 as discussed in more detail hereinbelow. Variations of low-profile mounting schemes may be utilized in place of or in conjunction with housing base 26.

Housing 16 provides ample internal spacing for upper bearing assembly 18, lower bearing assembly 20 and their bearing washers 46 that may be used to mount receptacle 22 (e.g., a clevis) for very low rotational friction. In the embodiment of FIGS. 1-3, duplicate or dual sets of two-axis joint assembly 10 are built into one housing, i.e., with duplicate sets of upper and lower bearings 18, 20 and receptacle 22 connections and other associated duplicate components. Because the additional components are duplicates, only one of each is discussed. Furthermore, it will be understood while FIGS. 1-3 show duplicate sets of two-axis joints built in one housing, two-axis joint 10 assembly may comprise only one two-axis joint 10 or, if desired, may comprise more than two two-axis joints, e.g., four or six two-axis joints within a single housing. It will be understood that if more than two sets of two-axis joint 10 are built into housing 16 that the housing will be suitably modified for proper distributions of forces applied to the joints. Housing 16 acts to distribute forces applied thereto onto housing base 26 so that the arrangement of two-axis joints 10 for use with more than two joints in one housing will take into consideration how these forces may best be distributed.

Mounting screws 47 or other fasteners may be utilized to secure housing 16 to housing base 26. Mounting screws 47 may also secure housing 16 housing base 26, or both to platform 50. It will be understood that two-axis joint 10 may be entirely surface mounted or may utilize only relatively short holes formed therein for mounting purposes. As well, other fasteners such as studs and nuts may be utilized, e.g., mounting support or platform 50 may comprise studs aligned with the holes in housing 16 and housing base 26.

Instead of being mounted on a shaft as in related art designs, a receptacle 22 such as a clevis, yoke or shackle is preferably mounted on flange or disk or planar member 24 which in turn is supported by upper and lower bearings 18 and 20. Flange or disk or planar member 24 may be any suitable, preferably planar member. It will be appreciated that in the present embodiment, the side forces or moments applied to two-axis joint 10 are applied to housing 16 and housing base 26 through upper bearing 18 and lower bearing 20 whereupon the forces may be further distributed to associated platform 50 by housing base 26. Thus, the need for a shaft to support such forces is eliminated. In this embodiment, upper and lower antifriction bearings 18 and 20 comprise thrust needle bearings disposed within upper and lower races as shown in FIG. 3. In this example, the upper and lower bearings are generally ring shaped. Conventionally, a thrust needle bearing is used for thrust loads, as the name implies. Thrust loads are defined as forces in the axial direction of the bearing. Thrust needle bearings are preferred because of the thin and flat physical shape of the needle bearings. Due to the thin and flat shape of the needle bearings, the spatial volume required for the housing collapses into a thin disc while a high moment capability is still maintained. The collapsing of the housing allows the bending moment from external loads to be reduced. Further, the location of the thrust needle bearings in conjunction to the arrangement of the bushings 29 allow the connection assembly to accommodate loads in the non-axial direction of the thrust needle bearing (e.g., side loads in the radial direction). This result is only possible with the unique bearing/bushing arrangement of the connection assembly where side loads are internally transformed into thrust loads. In other words, the resultant synergistic function of the thrust needle bearings, based on the unique arrangement of the connection assembly, is to accommodate side loads. In direct comparison, thrust needle bearings are designed to accommodate axial loads in related art devices. It is noted that during the development process, an unpredictable result transpired which resulted in a unique and synergistic function of the device. Specifically, the entire connection assembly permits surface mounting to the applicable structure or platform with absolutely no penetration. Surface mounting with no penetration is a result of the replacement of concentric ball bearings (in related art devices) by thrust needle bearings. Surface mounting capability is useful and beneficial because it provides an independency between the connection assembly and the applicable structure or platform it is mounted to. This independency de-couples design issues and simplifies the interface between two structures. If desired, upper and lower bearings 18 and 20, and receptacle 22, may be preloaded utilizing adjustment shims 44.

In this embodiment, base 26 comprises hub 28 which is round and which engages a corresponding socket in the bottom of receptacle 22. Hub 28 centralizes receptacle 22 within opening 30 in the top of housing 16. Hub 26 prevents side movement of receptacle 22. Hub 28 could be formed on receptacle 22 with a socket in base 26 or could be a separate component which fits into corresponding sockets in base 26 and receptacle 22. Bushing 29 may be utilized with hub 28. Alternatively, hub 28 may utilize antifriction or friction bearings to support lateral loads applied thereto. Alternatively to receptacle 22, sockets formed on housing base 26, on an internal surface of housing 16, or both may be utilized and sized larger than planar member 24 for receipt of planar member 24. In this case, the sockets may also comprise suitable bearings and so forth.

Receptacle 22 may comprise yoke or shackle portion 32 which is utilized to secure a rod or shaft such as shaft 36 as shown in FIG. 3. As illustrated in FIG. 1, yoke or shackle portion 32 may define openings for flanged bushing 38, shaft bushing 40 and other suitable components and fasteners to secure, in this case, the end of shaft 36 in position while allowing angular movement.

In summary, two-axis joint 10 is designed with a surface mount capability with a very flat profile. Two-axis joint 10 utilizes thrust needle bearings to provide smooth rotational motion suitably arranged in such a manner as to help react to the high moments expected and to accommodate loads in the non-axial direction of the thrust needle bearings. In the example shown in FIG. 2, two-axis joint assembly 10 at the shaft 36 may be used to connect an electro-mechanical actuator, such as electro-mechanical actuator 34 to its driven structural members.

It will be understood that a single two-axis joint assembly 10 in accord with a possible embodiment of the invention may comprise one housing base 26, one receptacle 22, one cap or housing 16, two thrust needle bearings 18, 20 and their bearing washers 46, and circular shim 44. Base 26 and housing 16 are connected to a grounding structure via fasteners 46 which preferably utilizes a bolt pattern designed therefore. Captive within housing 16 and housing base 26, are rotating receptacle 22 and upper and lower thrust needle bearings 18 and 20. Receptacle 22 may be attached to mechanical system (linear actuator) 34 or other desired member via a pin or shaft 36. Pin or shaft 36 and the rotational movement of receptacle 22 around hub 28 with respect to housing 16 provide two rotational degrees of freedom. In this example a first axis of rotation extends through shaft 36 and a second axis of rotation extends through hub 28.

The large diameter flange or planar member 24 of the receptacle 22 is sandwiched between the pair of thrust needle bearings, one on each side of the flange. During assembly of two-axis joint 10, circular shims 44 are used to adjust the amount of preload that is applied to upper and lower thrust needle bearings 18 and 20. The above arrangement enables the joint to handle high moments with minimal friction. To achieve the high moment capability within a low profile joint, the use of "depth of engagement" (like that in a conventional rotating shaft) to react moment is replaced with planar bearing engagement parallel to the mounting surface. Thrust needle bearings 18 and 20 and planar member 24 provide the surface area to react to the receptacle loads/moments into the housing base 26 and housing 16 while providing minimal friction during rotation.

The diameter of planar member 24 and thrust needle bearings 18 and 20 can be increased to react to higher loads and still maintain a compact surface mounting capability. Low profile two-axis joint 10 requires no deep penetrations into the support platform 50 and minimal part thickness. Not only does two-axis joint 10 require less space, it can also be used in applications where existing structures allow no penetrations. Furthermore, two-axis joint 10 possesses the flexibility that allows the diameter of the thrust needle bearings to increase to accommodate larger loads without going deeper into the existing structure.

While the preferred embodiment methods are disclosed in accord with the law requiring disclosure of the presently preferred embodiment of the invention, it will be readily understood after review of the specification that combinations of the apparatus and methods disclosed may also be used. The optimum system depends on the application. Therefore, the foregoing disclosure and description of the invention are illustrative and explanatory thereof and various changes in the method steps and also the details of the apparatus may be made within the scope of the appended claims without departing from the spirit of the invention.

What is claimed is:

1. A two-axis connection assembly for interconnecting a platform with two or more moveable members, said connection assembly comprising:

a housing comprised of two or more openings therein;

two or more disks positioned within said housing;

two or more receptacles wherein each of said two or more receptacles is in proximate spatial relationship to a first corresponding one of said two or more disks, wherein said each of said two or more receptacles is positioned within a second corresponding one of said two or more openings such that said each of said two or more receptacles capable of interconnecting with a third corresponding one of two or more moveable members to provide a plurality of first axes of rotational movement, wherein said two or more receptacles are aligned along the length of said housing and positioned in the same vertical direction with respect to each other;

two or more upper thrust needle bearings wherein each of said two or more upper thrust needle bearings supports to a fourth corresponding one of said two or more disks' upper surfaces;

two or more lower thrust needle bearings wherein each of said two or more lower thrust needle bearings supports a fifth corresponding one of said two or more disks' lower surfaces;

a base affixed to said housing, wherein said base comprises two or more hubs, wherein each of said two or more hubs rotatably supports a sixth corresponding one of said two or more receptacles, wherein said two or more hubs are formed along the inner surface of said base and project vertically along a third axis perpendicular to the length of said base; and two or more bushings, wherein each of said two or more bushings is in proximate spatial relationship with a seventh corresponding one of said two or more hubs and a eighth corresponding one of said two or more lower thrust needle bearings, and wherein said each of said two or more receptacles in combination with said first corresponding one of said two or more disks is capable of rotation within said housing to provide a second axis of rotational movement for third corresponding one of the two or more moveable members, wherein said second axis of rotational movement projects through said two or more hubs; and wherein said two or more upper thrust needle bearings and said two or more bushings in combination are capable of accommodating loads outside of said second axis of rotational movement.

2. The two-axis connection assembly of claim 1, further comprising two or more shims, wherein each of said two or more shims is in proximate spatial relationship to a ninth corresponding one of said two or more lower thrust needle bearings, wherein said each of said two or more shims is sized to adjust an amount of a preloaded force that is applied to said ninth corresponding one of said two or more lower thrust needle bearings.

3. The two-axis connection assembly of claim 1, further comprising two or more shafts, wherein each of said two or more shafts is in proximate spatial relationship with a tenth corresponding one of said two or more receptacles, and wherein each of said plurality of first axes of rotational movement projects through an eleventh corresponding one of said two or more shafts.

4. The two-axis connection assembly of claim 1, wherein each of said plurality of first axes of rotational movement is orthogonal with respect to said second axis of rotational movement.

5. The two-axis connection assembly of claim 1, wherein the height of said housing is less than one-third of the width of said housing.

* * * * *